(12) United States Patent
Hsu et al.

(10) Patent No.: US 12,117,288 B2
(45) Date of Patent: Oct. 15, 2024

(54) METHOD FOR DETECTING TEXTURE OF GEOMETRIC ELEMENT, GEOMETRIC SHAPE AND GEOMETRIC CENTER

(71) Applicant: H.P.B. OPTOELECTRONICS CO., LTD., Taichung (TW)

(72) Inventors: Hsuan-Yueh Hsu, Taichung (TW); Yuan-Ching Chao, Taichung (TW)

(73) Assignee: H.P.B. OPTOELECTRONICS CO., LTD., Taichung (TW)

( * ) Notice: Subject to any disclaimer, the term of this patent is extended or adjusted under 35 U.S.C. 154(b) by 189 days.

(21) Appl. No.: 17/974,815

(22) Filed: Oct. 27, 2022

(65) Prior Publication Data

US 2023/0137155 A1 May 4, 2023

(30) Foreign Application Priority Data

Oct. 29, 2021 (TW) ................................ 110140446

(51) Int. Cl.
*G01B 11/24* (2006.01)
*G01B 11/30* (2006.01)

(52) U.S. Cl.
CPC ............ *G01B 11/24* (2013.01); *G01B 11/303* (2013.01)

(58) Field of Classification Search
CPC ..... G01B 11/24; G01B 11/25; G01B 11/2513; G01B 11/14; G01B 11/22; G01B 11/002; G01B 11/2518; G01B 11/303; G01B 11/2527; G01B 11/2545; G01B 11/2433; G01B 11/2531; G01B 11/254; G01B 21/045; G01B 11/245; G01B 5/004; G01B 9/02091; G01B 11/2509; G01B 11/00; G01B 11/2522; G01B 11/30; G01B 11/03; G01B 11/2441; G01B 11/022; G01B 11/02; G01B 11/2536; G01B 2210/52; G01B 9/02004; G01B 11/005; G01B 9/0203; G01B 11/26; G01B 9/02015; G01B 21/042; G01B 11/27; G01B 11/007; G01B 11/04; G01B 2290/65; G01B 9/02072; G01B 11/06; G01B 11/0608; G01B 21/047;
(Continued)

(56) References Cited

U.S. PATENT DOCUMENTS

2014/0160490 A1\* 6/2014 Nishikawa ......... G01B 9/02007
356/511
2014/0198320 A1\* 7/2014 Park ....................... G01B 11/25
356/610

FOREIGN PATENT DOCUMENTS

CN 109906353 A \* 6/2019 ........... G01B 11/005
EP 3187822 A1 \* 7/2017 ............. G01B 11/00
(Continued)

*Primary Examiner* — Michael P Stafira
(74) *Attorney, Agent, or Firm* — Chun-Ming Shih; LANWAY IPR SERVICES

(57) ABSTRACT

The present invention relates to a method for detecting the texture, geometric shape and geometric center of a geometric element, which comprises the following steps: providing a first light beam projected on the object under test to obtain a gradual gradient image, and its texture and topography are reconstructed; providing a second light beam directed toward the object, and then the object is rotated, to obtain a continuous surface shape track, and reconstructs the surface shape of the object; calculating the geometric center from the surface shape track, and superimposes the surface shape track with the topography to rebuild a three-dimensional geometric contour of the object.

7 Claims, 2 Drawing Sheets

(58) Field of Classification Search
CPC .... G01B 5/25; G01B 11/026; G01B 11/2504; G01B 7/30; G01B 9/0209; G01B 11/043; G01B 11/046; G01B 11/08; G01B 2290/70; G01B 5/207; G01B 9/02064; G01B 11/12; G01B 11/16; G01B 11/167; G01B 2210/50; G01B 2210/56; G01B 7/004; G01B 9/02; G01B 9/02007; G01B 9/02016; G01B 9/02019; G01B 9/02028; G01B 9/02032; G01B 9/02034; G01B 9/02039; G01B 9/02047; G01B 9/021
See application file for complete search history.

(56) References Cited

FOREIGN PATENT DOCUMENTS

| | | | | | |
|---|---|---|---|---|---|
| JP | 2002098521 | A | * | 4/2002 | ............. G01B 11/24 |
| JP | 2009244227 | A | * | 10/2009 | |
| WO | WO-2008076979 | A1 | * | 6/2008 | ......... G01B 9/02004 |

* cited by examiner

METHOD FOR DETECTING TEXTURE OF GEOMETRIC ELEMENT, GEOMETRIC SHAPE AND GEOMETRIC CENTER

BACKGROUND OF THE INVENTION

1. Field of the Invention

The present invention relates to a method for detecting the three-dimensional geometric contour of an object, more particularly, to a method for detecting object texture and object topography by light wavefront first, and then detecting the surface track with the light beam, and finally superimposing the resulting information to reconstruct the actual geometric configuration of an object.

2. The Prior Arts

In the field of optical technology, whether concerning the procedure of product fabrication or quality control, they have been crucial processes for technology development and product management. For optical components, such as lenses, the quality required is getting higher and higher for minimizing dimension or special applications, so the method for inspecting the yield rate of products at the quality control end displays a decisive role.

The optical detection method generally includes contact or non-contact mode. The former damages the surface of the object to be tested frequently due to directly touching the object, so currently, in the optical field, non-contact detection is the primary process. The non-contact detection method is commonly used in various forms of interferometers, which utilize the interference phenomenon between the detection beam and the reference beam to observe the interference fringes and reconstruct the surface contour of the object by calculation. However, interference fringes are always affected by some factors, such as vibration, temperature, etc., and thus require a stable detecting environment to achieve high accuracy. On the other hand, due to the complexity of interference fringes or light spots, the accuracy of the resulting image analysis will be significantly affected if the detecting light beam cannot meet the requirement of coherence or collimation. Besides, if the factors or parameters included for analysis are complicated, the reconstruction process will be more difficult.

Therefore, if a detection method less interfered with by some factors, configured with a simplified detection mechanism, and has a non-overly complicated calculation process can be developed, the optical industry will be able to decrease the detection cost and improve the detection accuracy simultaneously.

SUMMARY OF THE INVENTION

Given the problems mentioned above, one of the objectives of the embodiments of the present disclosure is to provide a detection method that can decrease external environmental interference to improve detection accuracy or precision. To achieve the above object, an embodiment of the present disclosure provides a method for detecting the texture, geometric shape, and geometric center to build a three-dimensional geometric contour of a geometric element. The method comprising the steps of: (a) providing a first light source to emit a first light beam toward an object to be tested along a first optical axis, the first light beam emitted is first expanded and collimated and then transmits the object to form a topography detection light beam, and the topography detection light beam is detected by a first photodetector, which can collect imaging signals of the object in the direction of the first optical axis, and then performing calculations to reconstruct the texture and the topography of the object; (b) providing a second light source to emit a second light beam toward the object along a second optical axis, the second light beam emitted is first reflected from a surface of the object to form a track detection light beam, and the track detection light beam is detected by a second photodetector, which can collect imaging signals of a surface shape track of the object in the direction of the second optical axis; (c) rotating the object so that the second light source continuously or intermittently directs the second light beam toward the surface of the object in the direction of the second optical axis, and the second photodetector continuously collect a continuous surface shape track along the surface of the object in the direction of the second optical axis, and then performing calculations to reconstruct all the surface shape track of the object; and (d) calculating the geometric center from the surface shape track, and superimposing the surface shape track and the topography reconstructed to configure the three-dimensional geometric contour of the object.

In an example of the present disclosure, the step of rotating the object may be performed by a five-axis stage.

In one aspect of the embodiment, the step of rotating the object may be performed by a piezoelectric crystal actuator.

In another example of the present disclosure, the first light source may comprise a laser device.

In another aspect, the first light source may comprise, but is not limited to, a He—Ne laser device, a carbon dioxide laser device, a hydrogen fluoride laser device, a YAG laser device, or a YVO$_4$ laser device.

In an example of the present disclosure, the second light source may comprise a device emitting coherent light.

In yet another example of the present disclosure, the first photodetector or the second photodetector may comprise, but is not limited to, a photodetector integrated chip, such as a charge-coupled device (CCD), a complementary metal-oxide-semiconductor (CMOS) or a photodetector being able to transfer the photon energy to electrical energy.

By employing the method according to the present disclosure, an object's topography is obtained first through light wavefront interference. Then the surface shape track of the object is determined by the other beam scanning in another direction. Calculating through superimposing both reconstructed information above can finally and accurately rebuild the actual geometric topography and the three-dimensional spatial relationship of the object contour.

BRIEF DESCRIPTION OF THE DRAWINGS

Disclosed herein will be apparent to those skilled in the art by reading the following detailed description of a preferred embodiment thereof, with reference to the attached drawings, in which.

DETAILED DESCRIPTION OF THE PREFERRED EMBODIMENT

The following description and examples illustrate a preferred embodiment of the present invention in detail. They are used to describe the present invention, not to limit the scope of the present invention.

As used herein, "laser device" refers to a device capable of generating laser light, usually including a discharge mechanism, a gain medium, a resonant cavity, or a pump. The "laser light" usually refers to providing energy to make electrons transition from a low state to a higher energy level into an excited state. When they transition back to a low energy level, so-called spontaneous emission is generated. The photons emitted by the radiation collide with other atoms in the excited state and excite the same transition. The light emitted after excitation is called stimulated emission, and after continuous excitation, a high-intensity light is finally formed. The characteristic of a laser beam is that the photons have the same frequency, phase (coherence), and propagating direction. Therefore, the laser device, or other light sources with the characteristics mentioned above, being able to generate a concentrated light beam with a slight divergence angle, may all be the light source referred to by the present disclosure. Examples of laser devices may be, but are not limited to, gas laser devices such as He—Ne (helium-neon) lasers, carbon dioxide lasers, and hydrogen-fluorine lasers, or solid-state laser devices such as YAG lasers (neodymium-doped yttrium aluminum garnet lasers) and $YVO_4$ lasers (neodymium-doped yttrium orthovanadate lasers).

The "expander" described herein refers to a lens that can expand the diameter of an incident light beam to form an emergent light beam with a larger one, which may be a concave lens or a convex lens with an internal focus. Convex lenses can also combine individually with a concave lens or a convex lens to form an expander in the form of concave-convex lenses or convex-convex lenses.

A "tube lens" described herein refers to a lens or lens combination used to concentrate and collimate a light beam.

Figure 1:
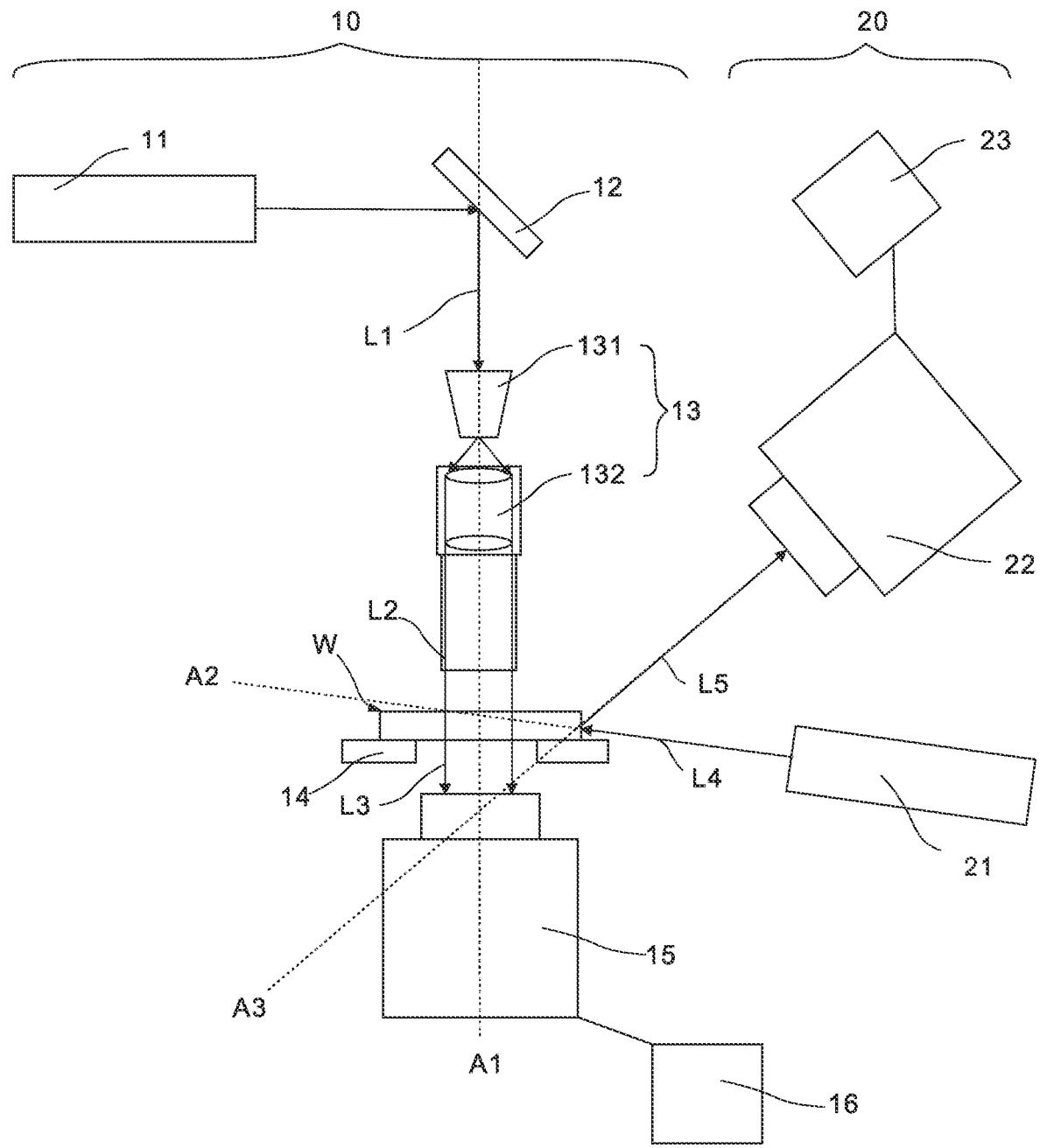
FIG. 1 is a schematic diagram showing a detection system for detecting the texture, geometric shape, and geometric center of a geometric element according to an embodiment of the present disclosure.

FIG. 1 is a schematic diagram showing a detection system for detecting the texture, geometric shape, and geometric center of a geometric element according to an embodiment of the present disclosure. The element structure and configuration are only for illustration and are not limited to the drawings. The detection system includes a topography detection mechanism 10 and a track detection mechanism 20. The topography detection mechanism 10 can emit a light beam forming wavefront toward the object W to be tested to obtain the topography information thereof in an axial direction, and the track detection mechanism 20 can continuously emit the other light beam toward the object W and collect the surface shape track thereof in the other axis. The geometric center of the object W can be measured from the surface shape track information. The surface shape track information is then superimposed with the topography information so that the three-dimensional contour of the object W can be further reconstructed.

The topography detection mechanism 10 directs a light beam to transmit the object W to generate the phenomenon of interference. The resulting variation of light spots or the interference fringes due to wavefront interference is collected and analyzed to obtain the topography information of the object W. In one embodiment, the topography detection mechanism 10 may include a first light source 11, a reflector 12, an expanding and collimating unit 13, a moving mechanism 14, a first photodetector 15, and a first analysis unit 16. The first light source 11 emits a first light beam L1 toward the reflector 12, which then reflects from the reflector 12 and is directed toward the expanding and collimating unit 13 along the first optical axis A1 (Z-axis). The first light beam L1 is then expanded and collimated by the expanding and collimating unit 13 to form an expanded and collimated light beam L2 and directed toward the object W. The expanded and collimated light beam L2 transmits through the object W and forms a topography detection beam L3, which is then imaged on the first photodetector 15; the first photodetector 15 is coupled with a first analysis unit 16 for processing and analyzing the collected imaging information from the first photodetector 15.

Figure 2:
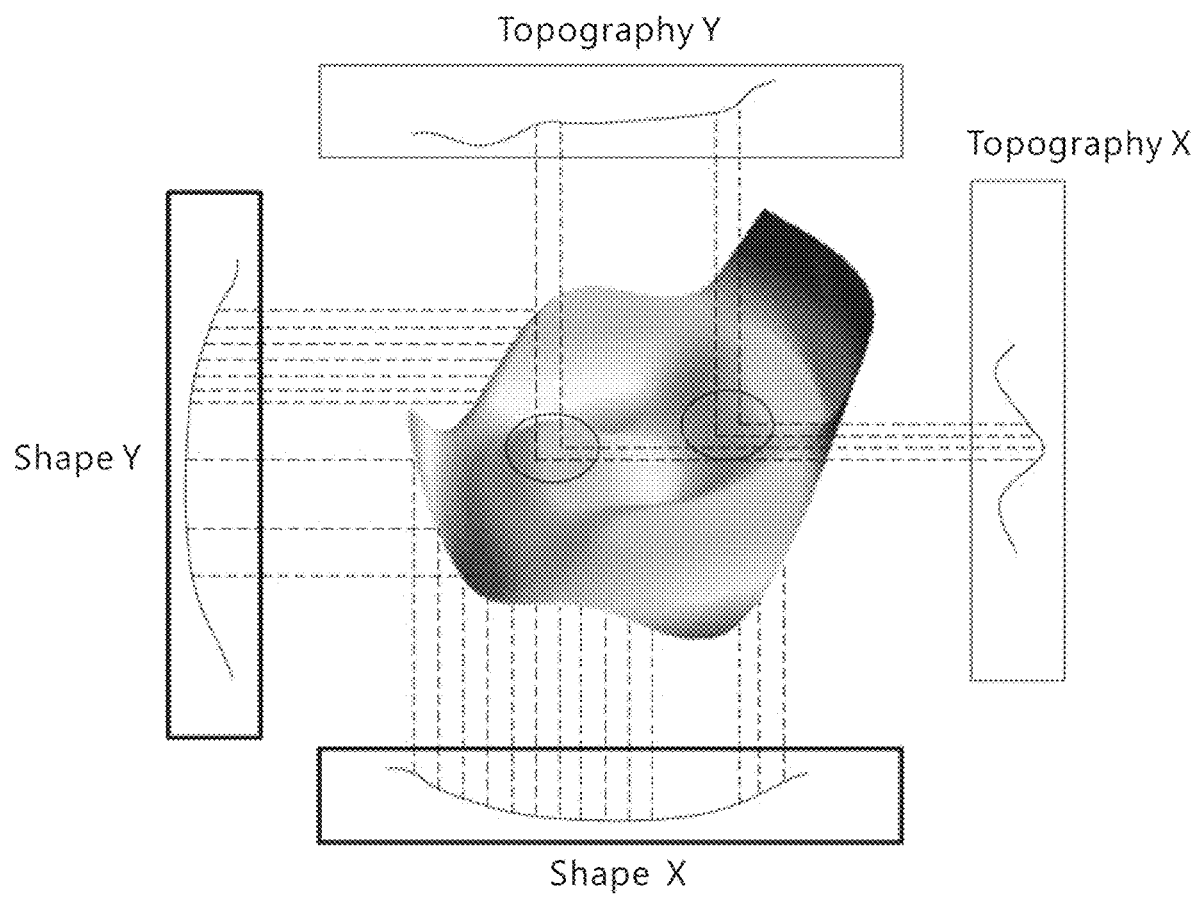
FIG. 2 is a schematic diagram showing a surface track and topography of an object detected according to an embodiment of the present disclosure.

If the surface or the shape of the object W is changed or deformed, such as forming protrusions or depressions, the imaging information collected by the first photodetector 15 would also be changed compared to the original. Because the incident expanded and collimated light beam L2 refracted inside the object W would generate optical path difference and leads to optical aberration. This change may be presented with a progressive gradient image, as shown in FIG. 2.

In one embodiment, the first light source 11 may be a light-emitting device capable of emitting a concentrated light beam. In the present embodiment, a He—Ne (helium-neon) laser device or a YAG laser device may be utilized to emit a concentrated light beam with a slight divergence angle, which is nearly collimated. When the emitted light beam is near collimation, the subsequent noise signal of interference will be significantly decreased so that calculation accuracy will be enhanced. The characteristic of the laser beam is that the photons emitted all have the same frequency, phase (coherence), and propagating direction. Therefore, the other light source with equivalent characteristics of the laser device may also be configured in the present disclosure, so the light sources are not limited to laser devices. The laser devices, for example, may be gas laser devices such as He—Ne laser, carbon dioxide laser, and hydrogen fluoride laser devices, as well as solid laser devices such as YAG laser and $YVO_4$ laser devices.

Due to the consideration of the volume requirement of the detection system, the light source 11 can be configured with a reflector 12 to reflect the incident light beam toward the desired direction. Without space consideration, the light source 11 may emit the first light beam L1 directly toward the expanding and collimating unit 13 without the reflector 12. However, for considering unique optical path design, more than one reflector 12 may also be provided. On the other hand, the expanding and collimating unit 13 in this embodiment is used to expand the incident light beam diameter and then collimate it so that the collimation of the emergent light beam can be adjusted and maintained. In this embodiment, the expanding and collimating unit 13 may include an expander 131 and a tube lens 132; the expander 131 expands the light beam diameter to enlarge the projected range onto the surface of the object W. The expander 131 may usually be a concave lens or a convex lens with an internal focus. The convex lens may also combine individually with a concave lens or a convex lens to form an expander in the form of concave-convex lenses or convex-convex lenses. The tube lens 132, concentrating and then collimating the light beam expanded by the expander 131, may be a lens or a combination of lenses. Thereby, through the expanding and collimating unit 13, the incident light beam can be expanded and collimated, and the divergence angle can be effectively controlled simultaneously to reduce the interference of scattered light and thus improve the accuracy of subsequent detection.

The topography detection mechanism 10 is configured with a moving mechanism 14 to rotate the mounted object W to present surfaces thereof in different directions and angles so that the emitted light beam (the second light beam L4) can scan the complete surface profile. In addition, by employing the automatically controlled moving mechanism, it can simultaneously decrease or avoid operation errors caused by manual movement. The moving mechanism 14 may comprise a multi-axis moving or rotating device. In this embodiment, it may be a five-axis stage capable of three-axis movement and two-axis rotation so that all the surface of the object W can be fully presented and the accuracy of movement or rotation can be achieved. In addition, according to the particular features or requirements of an object to be detected, a piezoelectric crystal actuator (PZT actuator) may also be configured, so there is no particular limitation to the type of the moving mechanism 14.

The track detection mechanism 20 may include a second light source 21, a second photodetector 22, and a second analysis unit 23. In this embodiment, the second light source 21 may emit a coherent light beam so that it may include, but is not limited to, the laser devices described above. In addition to coherent light beams with the same wavelength, coherent light beams with different wavelengths may also be used. Besides, the light beam emitted by the second light source 21 may be a multi-wavelength light beam, such as a white light source. However, through coherent light, the phase difference of the beam light would be easier to analyze, and thus the surface shape of the object to be tested can be distinctly presented. The second light beam L4 emitted from the second light source 21 is directed toward the object W along the optical axis A2 (X-axis) first and then reflected by the object W to form a track detection beam L5 along the optical axis A3 (Y-axis). In one embodiment, the track detection beam L5 may be reflected along an axis with a predetermined angle to the optical axis A3 (not shown). The track detection beam L5 is then imaged on the second photodetector 22, which is coupled with a second analysis unit 23 for processing and analyzing the collected imaging information from the second photodetector 22. The second photodetector 22 and the first photodetector 15 may be devices that can detect the intensity of the light spot or interference fringes and convert them into an electrical signal. In one embodiment, the second photodetector 22 and the first photodetector 15 may include a charge-coupled device or a complementary metal-oxide-semiconductor, but not limited to.

FIG. 2 is a schematic diagram of the recorded topography and surface shape of an object tested in one embodiment according to the present disclosure. The casting image (topography X, topography Y) of the object W can be obtained from the direction of the first optical axis A1 (Z-axis) by the topography detection mechanism 10. Through the Newton ring analysis or the gradient method, the surface topography and texture of the object W can be reconstructed after calculation. At the same time, the surface shape track (shape X, shape Y) in the direction of the side surface of the object W, from the optical axis A2 (X-axis) and the optical axis A3 (Y-axis) plane, is obtained by the track detection mechanism 20. Therefore, according to the embodiment of the present disclosure, the geometric center of the object W can be calculated from the surface shape track information mentioned above. In addition, the topography information obtained from the topography detection mechanism 10 and surface shape track information obtained from the track detection mechanism 20 are superimposed for calculation so that the three-dimensional geometric structure of the surface of the object W can be reconstructed. Since the present disclosure employs three-dimensional scanning detection, the surface profile of the object to be tested can be reconstructed accurately and thus is a fast and straightforward process for the relevant industry to perform quality control of surface roughness and flatness of products and geometric contour accuracy detection.

What is claimed is:

1. A method for detecting texture of geometric element, geometric shape and geometric center, comprising the steps of:
   (a) providing a first light source to emit a first light beam toward an object to be tested along a first optical axis, the first light beam emitted is first expanded and collimated and then transmits the object to form a topography detection light beam, and the topography detection light beam is detected by a first photodetector, which can collect imaging signals of the object in the direction of the first optical axis, and then performing calculations to reconstruct the texture and the topography of the object;
   (b) providing a second light source to emit a second light beam toward the object along a second optical axis, the second light beam emitted is first reflected from a surface of the object to form a track detection light beam, and the track detection light beam is detected by a second photodetector, which can collect imaging signals of a surface shape track of the object in the direction of the second optical axis;
   (c) rotating the object so that the second light source continuously or intermittently directs the second light beam toward the surface of the object in the direction of the second optical axis, and the second photodetector continuously collect a continuous surface shape track along the surface of the object in the direction of the second optical axis, and then performing calculations to reconstruct all the surface shape track of the object; and
   (d) calculating the geometric center from the surface shape track, and superimposing the surface shape track and the topography reconstructed to configure the three-dimensional geometric contour of the object.

2. The method according to claim 1, wherein the step of rotating the object is performed by a five-axis stage.

3. The method according to claim 1, wherein the step of rotating the object is performed by a piezoelectric crystal actuator.

4. The method according to claim 1, wherein the first light source comprises a laser device.

5. The method according to claim 4, wherein the first light source comprises a He—Ne laser device, a carbon dioxide laser device, a hydrogen fluoride laser device, a YAG laser device, or a YVO$_4$ laser device.

6. The method according to claim 1, wherein the second light source comprises a device emitting coherent light.

7. The method according to claim 1, wherein the first photodetector or the second photodetector comprises a charge-coupled device or a complementary metal-oxide-semiconductor.

* * * * *